Patented May 5, 1931

1,803,738

UNITED STATES PATENT OFFICE

ALFRED M. THOMSEN, OF SAN FRANCISCO, CALIFORNIA

METHOD OF MAKING SULPHITE PULP

No Drawing.  Application filed August 24, 1929. Serial No. 388,274.

Sulphite pulp is made by digesting chipped wood under pressure with an acid solution of either sulphite of lime, soda, or magnesia, or various mixtures of these substances. In any case there is obtained as end products the so-called "sulphite pulp", and a dark colored solution of the encrusting matter of the wood in combination with sulphur and the base or bases employed. It is in the further use of this liquor and of extracts prepared from this liquor in making fresh sulphite pulp that my improvements more specifically apply. The liquor itself, if the base employed be soda or magnesia, may be returned advantageously in part to the acid storage tanks,—the fresh cooking acid being so modified in composition as to accommodate the quantity desired. If lime be the base employed this cannot be done to the same extent without running the risk of "liming up" the blow pit bottoms and other equipment, but if the waste liquor be first treated with slacked lime, and the precipitate formed separated, then the liquor so treated may be used more freely.

In any case it is evident that only part of the waste liquor produced can be returned in this manner. To the remainder I apply the following scheme:

I neutralize, partly or entirely, with lime,—whereupon precipitate of a calcium salt of sulphur dioxide is produced. This is easily separated by settling, and after washing may be returned to the acid making system. This is equally applicable whether the base employed in cooking be soda, magnesia, or lime.

The application of both these steps results in the following advantages:—I. A saving in sulphur; II, less danger of burning the pulp; III, a final "waste liquor" that is more concentrated, e. g., containing a higher percentage of total solids, (this is particularly important when it becomes necessary to submit this substance to evaporation in order to keep it out of streams); IV, the elimination of free sulphur dioxide from the liquor; V, easier penetration of the chips used.

I claim:—

1. In the process of manufacturing sulphite pulp, the method of adding from 5% to 50% of the waste liquor produced to fresh cooking acid in making up the acid for a subsequent charge; adding lime to the remaining waste liquor; separating the precipitate formed by such addition; washing said precipitate; and returning said precipitate to the acid making system.

2. In the process of manufacturing sulphite pulp, the method of adding lime to the waste liquor produced; separating the precipitate formed; washing the precipitate, returning said precipitate to the acid making system; and using from 5% to 50% of the waste liquor from which the precipitate was separated in making up the acid for a subsequent charge.

3. In the process of manufacturing sulphite pulp, the method consisting of the following steps: 1st, adding from 5% to 50% of the waste liquor produced to fresh cooking acid in making up the acid for a subsequent charge; 2nd, adding lime to the remaining waste liquor; 3rd, separating the precipitate formed by such addition; 4th, washing said precipitate; 5th, returning said precipitate to the acid making system; and 6th, adding from 5% to 50% of the liquor resulting after the removal of the precipitate in step "3rd" to fresh cooking acid in making up a subsequent charge.

In testimony whereof, I hereunto set my signature.

ALFRED M. THOMSEN.